United States Patent [19]

Hein

[11] Patent Number: 4,964,436

[45] Date of Patent: Oct. 23, 1990

[54] VALVE WITH ROTARY VALVING ELEMENT

[75] Inventor: Alfred Hein, Mettlach, Fed. Rep. of Germany

[73] Assignee: MHA Zentgraf Merziger Hochdruck-Armaturen GmbH & Co., Merzig, Fed. Rep. of Germany

[21] Appl. No.: 458,080

[22] Filed: Dec. 28, 1989

[30] Foreign Application Priority Data

Apr. 29, 1989 [DE] Fed. Rep. of Germany ....... 3914327

[51] Int. Cl.⁵ ............................................. F16K 00/00
[52] U.S. Cl. ................................. 137/625.47; 251/174
[58] Field of Search ........................... 137/595, 625.47; 251/174

[56] References Cited

U.S. PATENT DOCUMENTS 2,520,591  8/1950  Wilmarth ............................. 137/595
3,175,801  3/1965  Taconis ........................ 137/625.47 X
4,222,412  9/1980  Carle ............................... 137/625.47
4,266,566  5/1981  Kacal et al. ...................... 251/174 X Primary Examiner—Arnold Rosenthal
Attorney, Agent, or Firm—Peter K. Kontler

[57] ABSTRACT

A valve wherein the housing has a first section with a hemispherical socket in one of its surfaces and a second section which overlies the one surface and confines a rotary hemispherical valving element in the socket. A polygonal extension of the valving element is rotatable in and extends through the second section to facilitate rotation of the valving element by means of a handle between a first position in which each two channels in the valving element communicates with a discrete pair of passages in the first section and at least one second position in which the channels are sealed from the passages. Sealing rings surround the passages adjacent the socket and are biased against the valving element by dished springs.

8 Claims, 2 Drawing Sheets

VALVE WITH ROTARY VALVING ELEMENT

BACKGROUND OF THE INVENTION

The invention relates to valves in general, and more particularly to improvements in valves with rotary valving elements. Still more particularly, the invention relates to improvements in valves which are especially suited to control the flow of fluids which are conveyed at elevated pressures.

Certain fluids (such as lacquers and paints) exhibit a pronounced tendency to incrustate on the adjacent solid parts and to thereby block the movements of certain parts, e.g., the movements of valving elements in valves which control the flow of paints or lacquers. For example, the rotary valving elements of conventional valves which control the flow of lacquers, paints and like fluids tend to jam when they are supposed to move from closed to open positions or vice versa. Moreover, the passages and channels for the flow of lacquers or paints through conventional valves having rotary valving elements are not readily accessible to permit scraping off the incrustated substances, and such passages and channels exhibit a rather pronounced resistance to the flow of fluids therethrough. Thus, cleaning of and other maintenance work upon conventional valves constitutes a costly and time-consuming operation. In addition, conventional valves are rather bulky and quite expensive. The high initial cost of conventional valves is attributable to the number and complexity of sealing devices which must be employed to prevent leakage of conveyed fluids, especially when the fluids are conveyed at elevated pressures.

OBJECTS OF THE INVENTION

An object of the invention is to provide a simple, compact and inexpensive valve having a rotary valving element, particularly a part spherical valving element.

Another object of the invention is to provide a valve which can reliably control the flow of lacquers, paints and/or other readily incrustatable fluids, even if the fluids are maintained at elevated pressures.

A further object of the invention is to provide a valve wherein the number of sealing devices is smaller than in conventional valves.

An additional object of the invention is to provide a novel and improved method of stressing sealing devices in the above outlined valve.

Still another object of the invention is to provide a novel and improved housing or body for use in the above outlined valve.

A further object of the invention is to provide a valve which can be rapidly taken apart to facilitate cleaning (e.g., scrubbing or scraping) of its fluid-contacting parts.

Another object of the invention is to provide a valve wherein the fluid-contacting parts are constructed and assembled in such a way that they can be readily cleaned to remove incrustations and/or other deposits.

SUMMARY OF THE INVENTION

The invention is embodied in a valve which can be used with particular advantage for controlling the flow of lacquers, paints and other fluids which are likely to incrustate on the parts that come in contact therewith. The improved valve comprises a body of housing including a first section having a surface provided with a socket (preferably a substantially hemispherical socket). The first section is further provided with first and second pairs of fluid-conveying passages which communicate with the socket, and the valve further comprises a rotary valving element which is disposed in the socket and has fluid-conveying first and second channels. The valve also comprises means for rotating the valving element relative to the first section of the housing between at least one first position in which the first and second channels respectively establish communication between the first and second pairs of passages and at least one second position in which the channels are sealed from the passages. The housing further comprises a second section (e.g., a substantially plate-like cover or lid) which overlies the surface of the first section to retain the valving element in the socket. The rotating means extends through and outwardly from one of the housing sections, preferably through the second section, and the valve still further comprises stressed sealing elements operating between the valving element and the first section of the housing to prevent leakage of conveyed fluid into the socket.

The valving element preferably includes a substantially hemispherical surface in the socket and a second surface which is flush or substantially flush with the surface of the first section of the housing.

The sealing elements can include rings which surround the passages adjacent the socket, and means for biasing the rings against the valving element. Such biasing means can comprise dished springs.

The first section of the housing can constitute a block-shaped body having a second surface substantially opposite the surface which is provided with the socket, and the passages have open ends remote from the socket and provided in the second surface of such first section.

The valve further comprises first sealing means interposed between the first and second sections of the housing, second sealing means interposed between the rotating means and the one section, and means for separably connecting the first and second sections to each other to thereby stress the first sealing means and the sealing elements.

The rotating means can include a polygonal extension forming part of the valving element and being rotatably mounted in the second section of the housing.

The passages of at least one pair and the respective channel preferably define an arcuate path for the flow of fluid in the first position of the valving element.

The novel features which are considered as characteristic of the invention are set forth in particular in the appended claims. The improved valve itself, however, both as to its construction and the mode of operating and assembling the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 2:
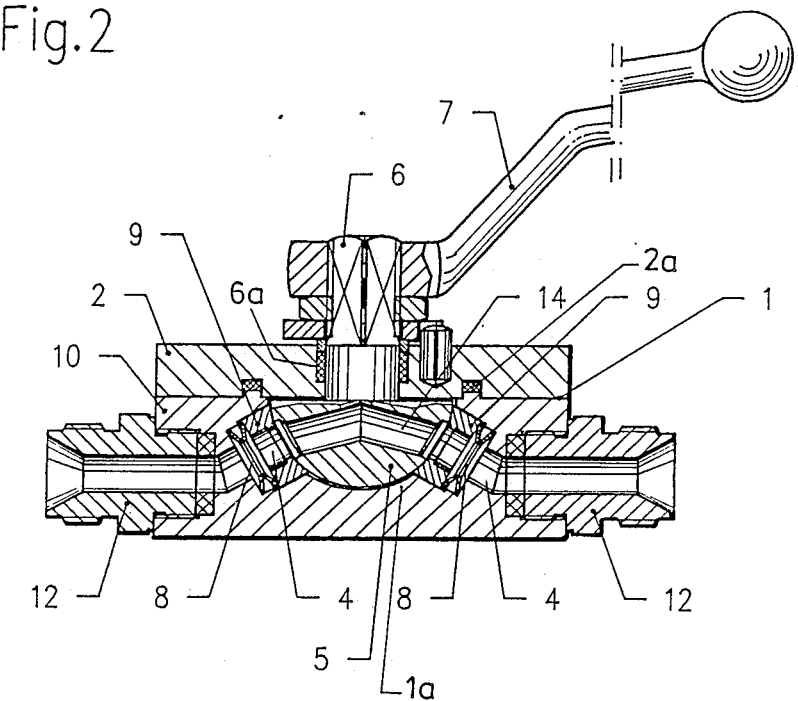
FIG. 2 is a sectional view substantially as seen in the direction of arrows from the line II—II of FIG. 1.
Figure 1:
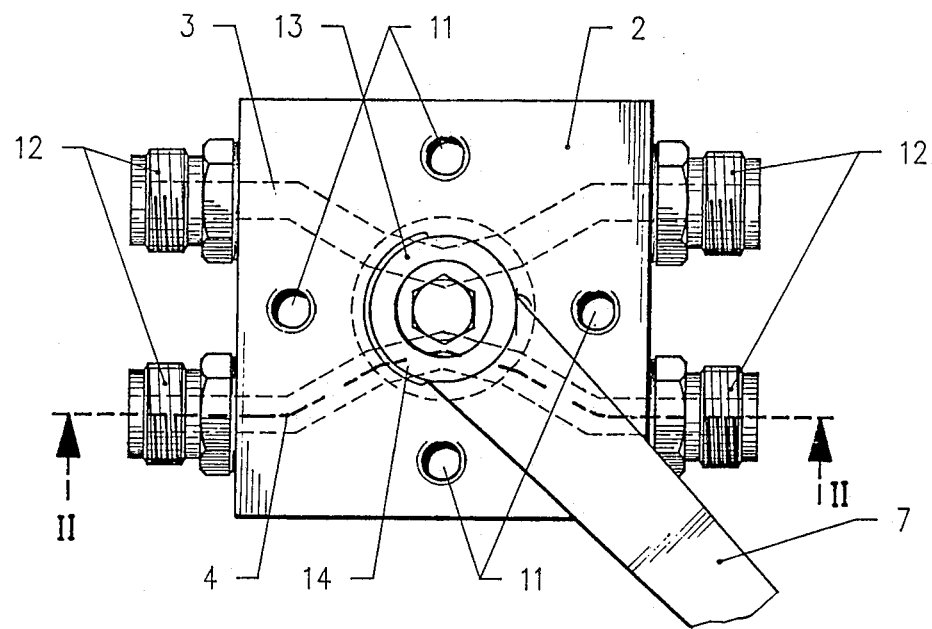
FIG. 1 is a plan view of a valve which embodies one form of the invention, with a portion of the rotating means broken away.

FIGS. 1 and 2 show a first valve wherein the housing or body includes a polygonal first section or base 10 having a flat surface 1 abutting or closely adjacent the underside of a second polygonal section 2 which constitutes a cover or lid for a substantially hemispherical rotary valving element 5 disposed in a complementary cavity or socket 1a of the surface 1. Screws 11 are employed to secure the section 2 to the section 10 and to thus stress certain sealing elements and/or devices in the housing.

The section 10 is formed with a first pair of slightly curved passages 3 having outer ends in communication with the bores of discrete threaded nipples 12 and inner ends in communication with the socket 1a, and a second pair of passages 4 having outer ends in communication with the bores of discrete nipples 12 and inner ends in communication with the socket 1a. The valving element 5 has a first arcuate channel 13 which establishes communication between the inner ends of the passages 3, and a second arcuate channel 14 which establishes communication between the inner ends of the passage 4 when the valving element assumes the position which is shown in FIGS. 1 and 2. The means for rotating the valving element 5 to and from the illustrated position comprises a polygonal extension 6 forming an integral or separable part of the valving element and extending upwardly through and beyond the second housing section 2, and a handle 7 which can be attached to the exposed portion of the extension 6 to change the angular position of the valving element in order to seal the inner ends of the passages 3 and 4 from the channels 13 and 14. The illustrated valving element 5 can be moved between two first positions in each of which the channels 13, 14 establish communication between the respective pairs of passages 3 and 4, and at least one second position in which the flow of a fluid from the left-hand nipples 12 to the right-hand nipples 12 (or vice versa) is interrupted. The valving element 5 can further assume one or more intermediate positions in which the paths for the flow of fluid between the pairs of passages 3 and 4 are partially interrupted. The nipples 12 can be connected to hoses and/or pipes which serve to supply fluids to and to evacuate fluids from the housing section 10. The passages 3 and the channel 13 or 14 can convey a first fluid, and the passages 4 and the channel 14 or 13 can convey a different second fluid. The arrangement may be such that the rotating means 6, 7 can be operated to turn the valving element 5 through 45 degrees from the illustrated angular position (clockwise or counterclockwise) in order to seal the passages 3, 4 from the channels 13, 14 of the valving element.

The valve further comprises ring-shaped sealing elements 9 which surround the inner ends of the passages 3, 4 and are biased against the adjacent portions of the hemispherical surface of the valving element 5 by dished springs 8. These springs (or analogous biasing means) serve to ensure that the conveyed fluids cannot leak into the socket 1a, i.e., into the gap (if any) between the convex surface of the valving element 5 and the complementary concave surface in the socket 1a. The dimensions of the sealing elements 9 and of the respective springs 8 are selected in such a way that the sealing elements are automatically stressed when the valving element 5 is properly received in the socket 1a, i.e., when the screws 11 are applied to maintain the second housing section 2 in abutment with or sufficiently close to the surface 1 of the section 10. At such time, the sections 2, 10 deform one or more annular sealing devices 2a which are provided in a groove at the underside of the section 2. At least one additional sealing device 6a is interposed between the extension 6 of the valving element 5 and the section 2.

The arcuate paths which are defined by the passages 3, 4 and the respective channels 13, 14 in the illustrated angular position of the valving element 5 are mirror symmetrical to each other.

In order to clean the valve, e.g., to scrape off incrustated lacquer or paint which gathers on the convex surface of the valving element 5 and/or on the concave surface in the socket 1a of the housing section 10, the operator removes the screws 11 and resorts to a suitable brush or other material removing tool. The possibility to carry out such thorough and convenient cleaning constitutes an important feature of the invention. Another advantage of the improved valve is that the conveyed fluid or fluids are confined to the flow along predetermined paths by resorting to a relatively small number of simple sealing elements and sealing devices. As mentioned above, the valve is particularly suitable to ensure controlled flow of highly pressurized fluids including paints, lacquers and other fluids which exhibit a tendency to incrustate so that the valving element requires frequent inspection and thorough cleaning including scraping off the layer or layers of incrustated material.

As can be readily seen in FIG. 2, the combined height of the housing sections 2 and 10 is a relatively small fraction of the width or depth of the illustrated housing. Such compactness of the housing, and hence of the entire valve, is often desirable and advantageous in connection with the spraying or other application of lacquers, paints and other fluids. Moreover, the only slightly curved paths for the flow of fluids through the passages 3, 4 and the respective channels 13 or 14 offer only relatively small resistance to the flow of fluids through the housing and the valving element 5 of the improved valve. Valves of the type embodying the present invention can be used with advantage in the automobile making industry or in repair shops to spray lacquers or paints onto selected parts of bodies of motor vehicles or onto parts under the hood or elsewhere in the motor vehicles.

Figure 3:
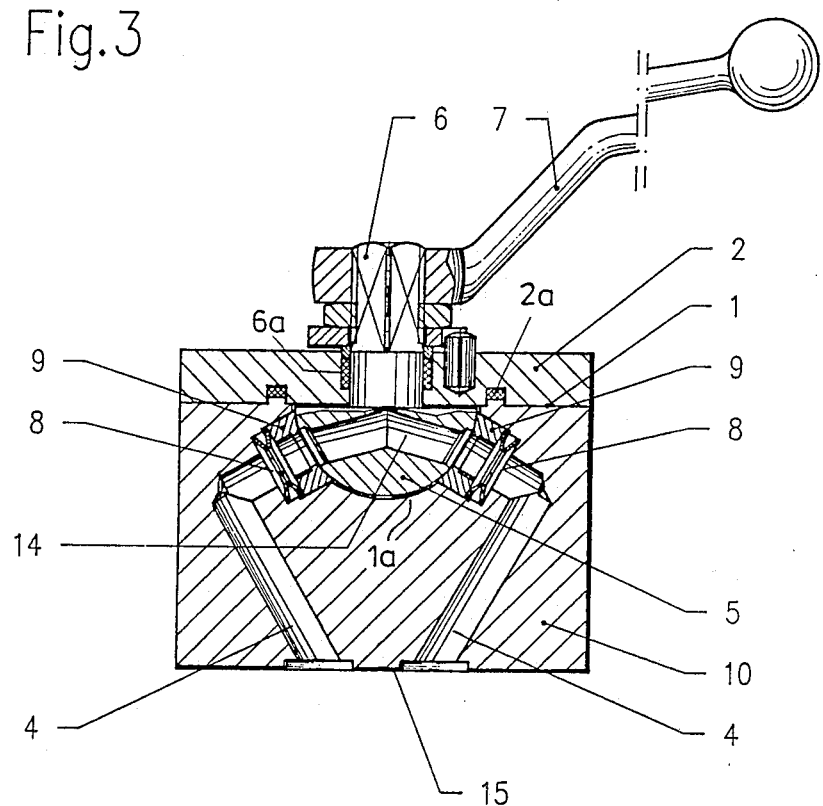
FIG. 3 is a sectional view of a second valve having a modified housing.

FIG. 3 shows a modified valve wherein the second section 2 of the body or housing, the substantially hemispherical valving element 5, the rotating means 6, 7 and the sealing elements and sealing devices are or can be identical with the corresponding component parts of the valve of FIGS. 1 and 2. The difference between the two valves is that the first section 10 of the housing in the valve of FIG. 2 constitutes a substantially block-shaped body having a surface 15 located opposite the surface 1 and having openings constituting the outer ends of the passages 3 and 4 (only the two passages 4 can be seen in FIG. 3). The section 10 of this modified valve can be secured (e.g., by screws or bolts) to a hydraulic aggregate wherein the fluid or fluids are maintained at an elevated pressure. The aggregate has passages which register with the ends of passages 3 and 4 in the surface 15 when the block-shaped housing section 10 of FIG. 3 is properly secured to the aggregate. The valve of FIG. 3 can dispense with the nipples 12 which are shown in FIGS. 1 and 2. Each of the two illustrated embodiments of the improved valve can dispense with so-called blind threaded joints Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A valve comprising a housing including a first section having a surface provided with a socket, said first section further having first and second pairs of fluid-conveying passages communicating with said socket; a rotary valving element disposed in said socket and having fluid-conveying first and second channels; means for rotating said valving element relative to said first section between at least one first position in which said first channel establishes communication between the passages of said first pair and said second channel establishes communication between the passages of said second pair and at least one second position in which said channels are sealed from said passages, said housing further including a second section overlying said surface to retain said valving element in said socket, said rotating means extending through and outwardly from one of said sections; and stressed sealing elements operating between said valving element and said first section to prevent leakage of conveyed fluid into said socket.

2. The valve of claim 1, wherein said valving element has a substantially hemispherical surface in said socket and a second surface substantially flush with the surface of said first section.

3. The valve of claim 1, wherein said sealing elements include rings surrounding said passages adjacent said socket, and means for biasing said rings against said valving element.

4. The valve of claim 3, wherein said biasing means comprises dished springs.

5. The valve of claim 1, wherein said first section has a second surface substantially opposite said first named surface and said passages have open ends in said second surface.

6. The valve of claim 1, further comprising first sealing means interposed between said sections, second sealing means interposed between said one section and said rotating means, and means for separably connecting said sections to each other to thereby stress said first sealing means and said sealing elements 7. The valve of claim 1, wherein said valving element has a polygonal extension forming part of said rotating means and being rotatable in said second section.

8. The valve of claim 1, wherein the passages of at least one of said pairs and the respective channel define an arcuate path for the flow of fluid therethrough in the first position of said valving element.

* * * * *